Oct. 4, 1932.   A. GOODHEIM ET AL   1,881,271
SEALING DEVICE
Filed May 27, 1931
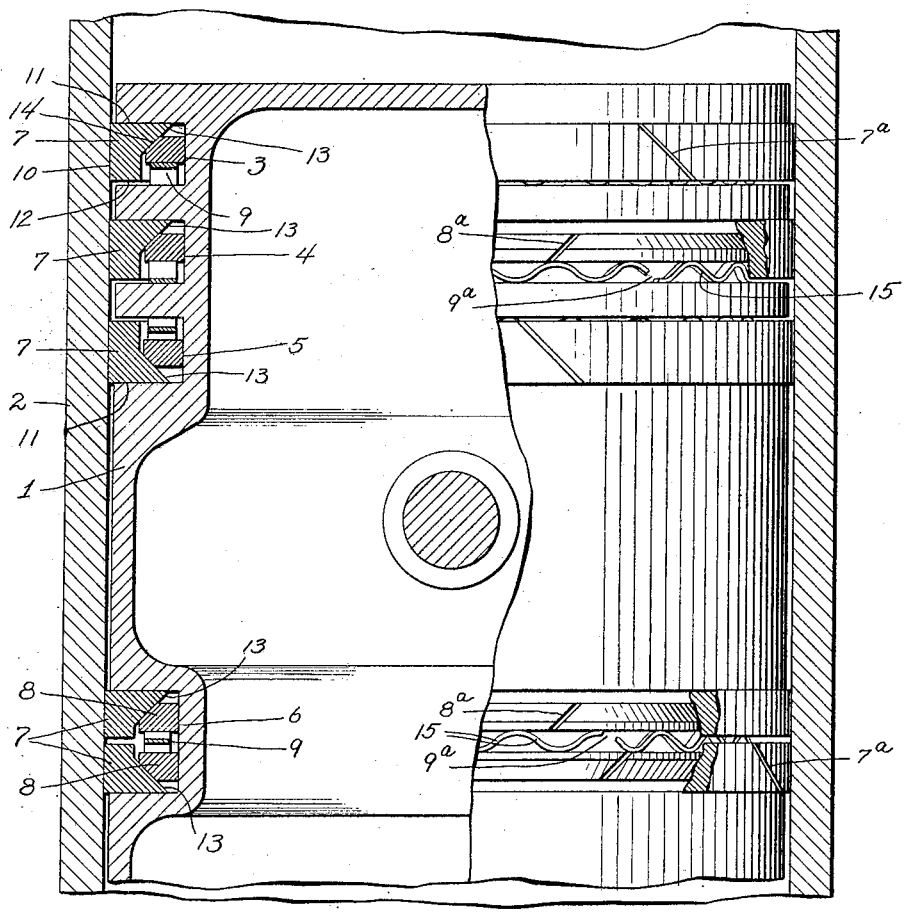
INVENTOR.
ALBERT GOODHEIM.
ERNEST WAGNER.
BY
ATTORNEY Patented Oct. 4, 1932

1,881,271

UNITED STATES PATENT OFFICE

ALBERT GOODHEIM, OF NORTH BERGEN, AND ERNEST WAGNER, OF UNION CITY, NEW JERSEY

SEALING DEVICE

Application filed May 27, 1931. Serial No. 540,258.

This invention relates to sealing devices commonly referred to as piston rings for use in connection with pistons and other reciprocating bodies or plungers in apparatus of various kinds and classes, and particularly for use in connection with the pistons of internal combustion engines; and the object of the invention is to provide a sealing device consisting of inner and outer split rings having cooperating, adjacent, beveled surfaces which operate to hold the outer ring in engagement with the cylinder wall and the inner ring in engagement with the inner wall of the ring groove, thus forming a relatively solid wall structure between the bottom wall of the ring groove and the cylinder wall, maintaining the outer ring in proper engagement with the cylinder wall at all times; a further object being to provide a spreader or other ring element cooperating with the inner ring to maintain the beveled surfaces of the inner and outer rings in firm engagement at all times; a still further object being to provide a relatively wide surface to the outer ring for exposure to the pressure within the cylinder in the operation of the piston therein and also for exposure to the oil film and what is known as the wiping ring; a further object being to provide a sealing device of the class described which will operate to prevent or eliminate, to a major degree, the stresses or strains to which the piston of internal combustion engines is subjected to eliminate uneven wear of the cylinder wall and the resulting piston slap which commonly develops in the operation of high compression internal combustion engines; and with these and other objects in view, the invention consists in a sealing device of the class and for the purpose specified, which is simple in construction, efficient in use, and which is constructed as hereinafter described and claimed.

The invention is fully disclosed in the following specification, of which the accompanying drawing forms a part, in which the separate parts of our invention are designated by suitable reference characters, and in which:

The drawing shows a side and sectional view of a piston arranged in part of a cylinder showing a number of our improved sealing devices therein.

For the purpose of showing one method of carrying our invention into effect, we have shown in the drawing a piston 1, and have indicated at 2 a part of a cylinder in which the piston operates. At 3, 4, and 5 is shown a series of ring grooves disposed at the upper or head end of the piston, and another larger ring groove 6 is disposed at the lower or skirt end of the piston.

In practice, we employ a sealing device containing a series of three ring elements, namely an outer ring 7, an inner ring 8 and a spreader ring 9. Arranged in the ring groove is a pair of such elements subdivided by a single spreader. Each of the ring elements is split as indicated at 7a, 8a and 9a.

The ring element 7 is of a width substantially equal to the width of the ring groove in which the same is mounted, and when two of such rings are employed as shown in the groove 6, the combined rings will be substantially equal to the width of the groove, a slight clearance being provided for free movement of said rings. Thus, each ring 7 has a relatively wide surface 10 for engagement with the wall of the cylinder 2. At one side of said ring is another wide surface 11, the opposite side 12 being comparatively narrow and the inner or rear surface of the ring 7 is partially beveled as seen at 13 to engage a correspondingly beveled surface 14 on the ring 8, so that when the rings 7—8 are mounted in the ring groove of the piston, and the piston is disposed in the cylinder, the inner surface of the ring 8 will engage the bottom wall of the ring groove and the outer surface 10 will engage the cylinder wall. Said rings are held in this engagement by the spreader 9 which is in the form of a corrugated, annular band forming a plurality of circumferentially spaced spring loops 15 as indicated at the right of the drawing. It will be noted that the side 11 of the ring 7 in the groove 3 is arranged upwardly and exposed to the compression above the piston in the cylinder; whereas, the side surface 11 of the ring 7 arranged in the groove 5 is directed downwardly, which aids in removing the oil film and preventing oil from leaking by the rings into the cylinder above the piston.

It will be understood, however, that the rings 7 in the groove 6 are intended for this purpose as well as for the purpose of eliminating and taking up the piston stresses, especially in the firing stroke, to eliminate uneven wear on the cylinder wall.

This is one of the distinctive features of our invention and is accomplished by virtue of the fact that a substantially solid wall structure is formed between the cylinder wall and the bottom wall of the ring groove of the piston through the rings 7 and 8, which maintains the outer surface 10 of the ring 7 in parallel relation to the cylinder wall and prevents rocking, radial movement of the piston on the wrist pin, especially in the firing stroke, which has heretofore caused the uneven wear upon the cylinder wall, resulting ultimately in what is known as piston slap.

We are aware of the fact that it is old in the art to use two piston rings having engaging beveled surfaces in the ring groove of a piston, but heretofore, it has been customary to leave a space at the inner ends of the rings or between the inner ring and the bottom wall of the ring groove, and in some instances, springs have been introduced between the inner wall of the ring groove and the inner ring. But, all of these structures fail to perform the function and result for which our sealing device or combination of rings is designed.

While we have shown our invention as applied to a device of specific structure, it will be understood that we are not necessarily limited in this respect, nor are we limited to the specific arrangement of rings herein shown and described, and various changes in and modifications of the structure herein set forth may be made within the scope of the appended claims without departing from the spirit of our invention or sacrificing its advantages.

Having fully described our invention, what we claim as new and desire to secure by Letters Patent, is:

1. A sealing device for pistons comprising in combination with a ring groove formed in the piston, two split rings having interengaging beveled surfaces, one of said rings constituting the outer ring and being of a width substantially equal to the width of the ring groove and adapted to engage the wall of the cylinder in which the piston is mounted, and the other or inner ring being of substantially one-half the width of the outer ring and adapted to engage the bottom wall of the ring groove of said piston, and tensional means supported in the ring groove between one side wall of the groove and one side wall of said inner ring to move said inner ring into engagement with substantially the entire circumference of the bottom wall of the ring groove and to move the outer ring into engagement with the cylinder wall.

2. A sealing device for pistons comprising in combination with a ring groove formed in the piston, two split rings having interengaging beveled surfaces, one of said rings constituting the outer ring and being of a width substantially equal to the width of the ring groove and adapted to engage the wall of the cylinder in which the piston is mounted, and the other or inner ring being of substantially one-half the width of the outer ring and adapted to engage the bottom wall of the ring groove of said piston, tensional means supported in the ring groove between one side wall of the groove and one side wall of said inner ring to move said inner ring into engagement with substantially the entire circumference of the bottom wall of the ring groove and to move the outer ring into engagement with the cylinder wall, and said means comprising a split annular spreader ring having a plurality of circumferentially spaced spring loops.

3. A sealing device for pistons having a comparatively narrow ring groove, said device comprising inner and outer split rings, the outer ring being of a width substantially equal to the width of the ring groove and having a wide side surface engaging one side wall of the ring groove, the inner ring being of a width materially less than that of said groove and disposed within the side walls of the ring groove, and a tensional spreader device disposed between one side of the inner ring and the adjacent side wall of the ring groove and adapted to exert pressure on both of said rings to move the outer ring into engagement with the cylinder wall and the inner ring into engagement with the bottom wall of the ring groove.

In testimony that we claim the foregoing as our invention we have signed our names this 25th day of May, 1931.

ALBERT GOODHEIM.
ERNEST WAGNER.